(12) United States Patent
Fu et al.

(10) Patent No.: US 8,213,724 B2
(45) Date of Patent: Jul. 3, 2012

(54) APPARATUS AND METHOD FOR LABELING A VIDEO, FOR MODIFYING A VIDEO, AND FOR VIDEO PROCESSING

(75) Inventors: Rong Yao Fu, Beijing (CN); Quan Yuan, Beijing (CN); Xia Tian Zhang, Beijing (CN); Shi Wan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 12/235,983

(22) Filed: Sep. 23, 2008

(65) Prior Publication Data

US 2009/0087105 A1    Apr. 2, 2009

(51) Int. Cl.
G06K 9/62    (2006.01)
(52) U.S. Cl. ........................................ 382/224
(58) Field of Classification Search ............ 382/103, 382/173, 224, 305
See application file for complete search history.

(56) References Cited

U.S. PATENT DOCUMENTS

| 7,242,802 | B2 * | 7/2007 | Curry et al. ................... | 382/173 |
| 2002/0095332 | A1 | 7/2002 | Doherty et al. | |
| 2009/0087112 | A1 * | 4/2009 | Zyuzin ......................... | 382/243 |

OTHER PUBLICATIONS

ALSTRASOFT, AlstraSoft Video Share Enterprise, http://www.alstrasoft.com/videoshare.htm, (pdf web page visited on Sep. 8, 2008).
www.dartmotif.com, Aug. 29, 2007, pp. 1-23.

* cited by examiner

Primary Examiner — Duy M Dang
(74) Attorney, Agent, or Firm — Vazken Alexanian

(57) ABSTRACT

An apparatus and method for labeling a video, an apparatus and method for modifying a video, a video searching method and an advertising method. The method for labeling a video includes labeling at least one object with its properties. The method for modifying a video includes replacing at least one object labeled as "can be replaced" with another object and modifying at least one object if the object has been labeled as "can be modified." The video searching method includes labeling at least one object in at least one video with its properties and searching the video for an object of interest using the properties labeled on at least one object. The advertising method includes creating a video having an object labeled by an author's name, modifying the video by replacing the labeled object with an advertising object or modifying the labeled object as an advertising object by the advertiser, and distributing the video so that end user can watch the modified video.

16 Claims, 3 Drawing Sheets

| Header | Tagged Data Block (TDB) | TDB | TDB | .... | EndTag |
Fig.1
Fig.2
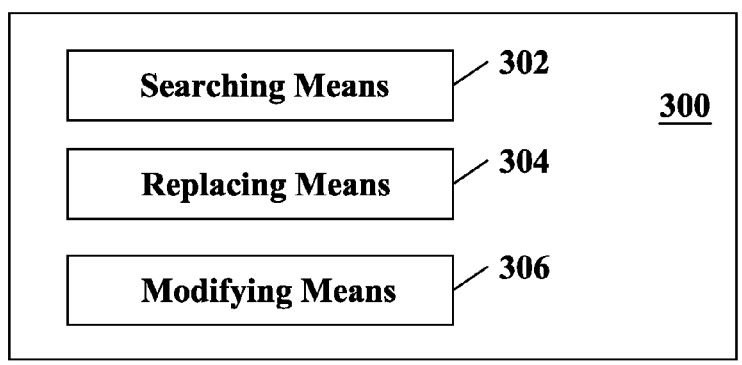
Fig.3

APPARATUS AND METHOD FOR LABELING A VIDEO, FOR MODIFYING A VIDEO, AND FOR VIDEO PROCESSING

CROSS-REFERENCE TO RELATED APPLICATIONS

This application claims priority under 35 U.S.C. §119 to Chinese Patent Application No. 200710162206.4 filed Sep. 30, 2007, the entire contents of which are incorporated by reference herein.

BACKGROUND OF THE INVENTION

1. Field of the Invention

The present application relates to video processing, particularly to an apparatus and a method for labeling a video, an apparatus and a method for modifying a video, an apparatus and a method for processing a video.

2. Description of the Related Art

It is an obvious trend that online video plays a more and more important role on the web. For example, videos occupy nearly 62% of the bandwidth of P2P websites. Meanwhile, video share platforms based on user generated contents, such as Youtube, are blooming now. With the booming of the online contents, now the users have much more choices than before to watch videos. Long Tail Theory is also applicable in the shift from traditional broadcast TV to online video watching, from passively accepting content to actively pulling content from multi channels. In this circumstance, advertiser pushing ads to the user in golden time or hot topic on TV will not work effectively because the user can choose which video content to pull now.

As to video advertising, it is not just simply a switch to a new online platform because the web is an interactive platform and can support some functions which TV platforms cannot, such as search. As such, something really new and big can breakout in the shift. American Advertising Federation (AAF)'s study in 2006 also shows that the leading ad executives of 500 top companies expect a significant portion of broadcast and cable TV ad dollars to shift to online video by 2010, with 33 percent of respondents predicting that the switch will be between 10 and 19 percent. In addition, 2007 budgets for online advertising are expected to rise by an average of 42 percent over 2006. Moreover, if the online video technology and model matures, it can also attract ad funding from other online ad forms, such as banner ads and literal link ads.

There are huge opportunities for online video advertisement; however, current ads models for online video have their limitations. Several types of advertising models can be found in the online video market. Usually, we can see video ads in top, bottom or side of a webpage. Apparently, the ads can have little relation with the page's content. Second, for a video platform like Youtube, video ads can be classified and made as a special channel. Users rarely click these ads intentionally. Thirdly, some people suggest that ads can be added in the head, tail or middle of a normal video, but it degrades the user experience and user can skip them. Finally, we can see that Adsense/Adwords combined with Youtube can bring out a new way for doing advertising. This means that each registered Youtube user can be an Adsense/Adwords user when a user uploads clips and then these clips are automatically linked with relevant ads. However, these relevant ads are still in character forms.

In the age of the Long Tail Theory, we consider Google's Adsense/Adwords to be a classic application to realize this theory in character form. Naturally, there exists a need for an ads application in the video form. If ads could be injected into video clips, then the ads will be watched by the end-user uninterrupted. This has multiple benefits: the end users can NOT bypass the ads when watching video; the ads are lively in the video contents which will get more focus and impression from the end users.

SUMMARY OF THE INVENTION

Accordingly, the present invention provides an apparatus and a method of facilitating the injecting of ads into a video. To this end, one aspect of the present invention provides an apparatus and a method for labeling a video including a plurality of objects.

Specifically, the method for labeling a video according to the invention includes labeling at least one object among the plurality of objects with its properties. The apparatus for labeling a video according to an embodiment includes a first labeling means for labeling at least one object among the plurality of objects with its properties.

In another aspect, the invention provides an apparatus and a method for modifying a video, wherein at least one object in the video has been labeled with its properties.

Specifically, the method for modifying a video according to the invention includes: replacing said at least one object with another object if the object has been labeled as can be replaced; and modifying said at least one object if the object has been labeled as can be modified. The apparatus for modifying a video according to the invention includes: replacing means for replacing said at least one object with a new object if the object has been labeled as can be replaced, and modifying means for modifying said at least one object if the object has been labeled as can be modified.

In further another aspect, the invention provides a video processing method, including the following steps of: providing a video including a plurality of objects, wherein at least one object is labeled with at least one of the following properties: whether the object is replaceable; and at least one of the name, color, size and content of the object; providing a new replacement object; searching the objects of the video for object of interest based on a property of the new replacement object, the property of the new replacement object including at least one of the name, color, size and content of the new replacement object; determining a replaceable object in the video having a property matching that of the new replacement object; and replacing the replaceable object as determined with the new replacement object.

The present invention further provides a video processing apparatus, including: video providing means for providing a video including a plurality of objects, wherein at least one object is labeled with at least one of the following properties: whether the object is replaceable; and at least one of the name, color, size and content of the object; object providing means for providing a new replacement object; searching means for searching the objects of the video for object of interest based on property of the new replacement object, the property of the new replacement object including at least one of the name, color, size and content of the new replacement object; determining means for determining a replaceable object in the video having a property matching that of the new replacement object; and replacing means for replacing the replaceable object as determined with the new replacement object.

The present application also provides a program for enabling a computer to recognize said method for labeling a video, said method for modifying a video, and storage medium storing said program therein.

BRIEF DESCRIPTION OF THE DRAWINGS

The invention will be described in details with reference to the accompanying drawing, wherein:

FIG. 1 is schematic view of the configuration of a flash movie;

FIG. 2 is a schematic view of an apparatus for labeling a video according to one embodiment of the invention;

FIG. 3 is a schematic view of an apparatus for modifying a video according to one embodiment of the invention;

DETAILED DESCRIPTION OF PREFERRED EMBODIMENTS

Figure 4:
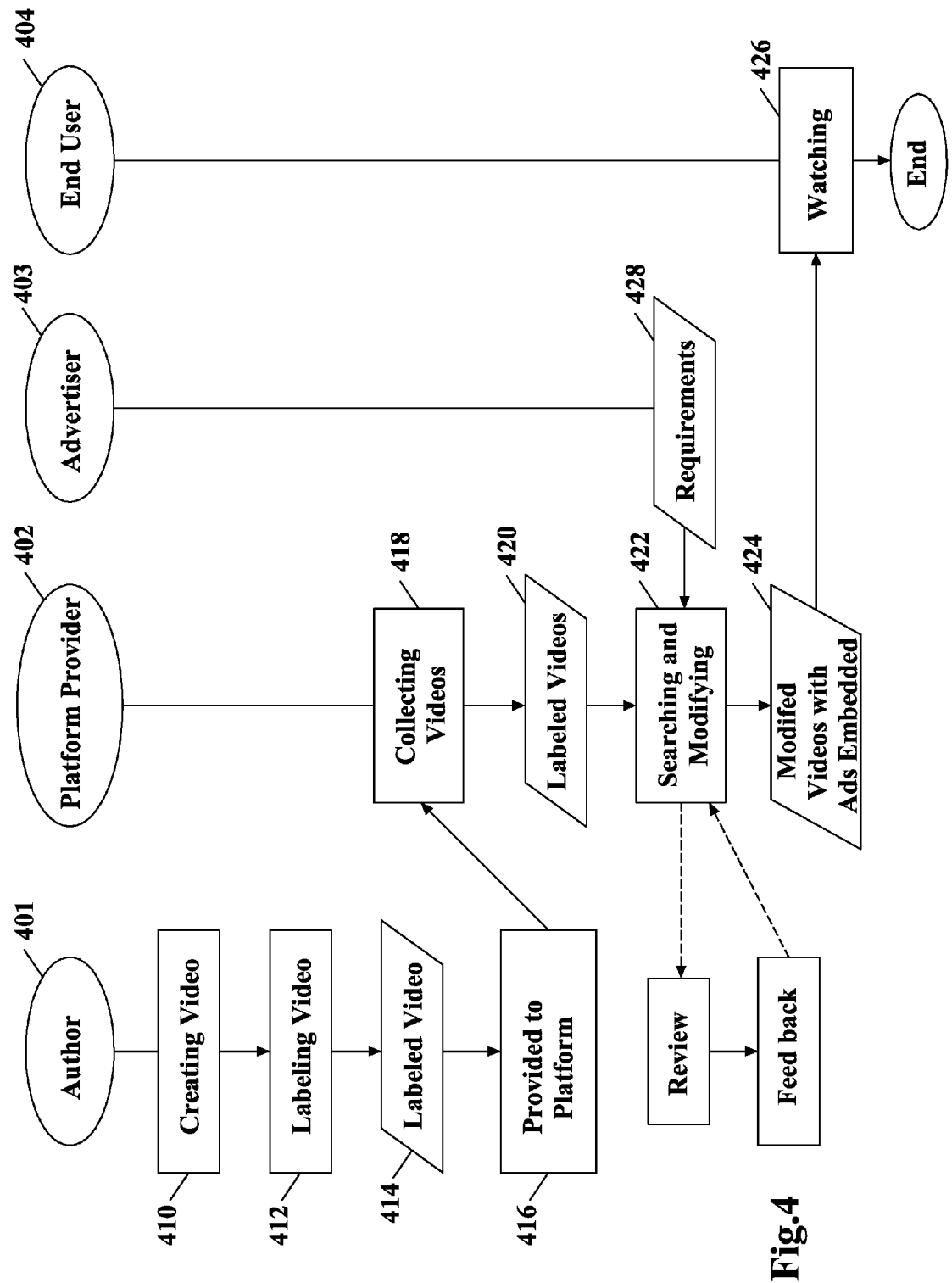
FIG. 4 is a schematic view of an advertising method according to one embodiment of the invention.

Preferred embodiments of the invention will be described below with reference to the accompanying drawings.

The basic idea of the present invention includes a preliminary step in which an object that could be modified as an ad or could be replaced by an ad in a video is labeled. Then, in an application step, the labeled object is modified as or replaced by wanted ads.

In one embodiment, the format of a flash video file, which is a .SWF file is analyzed.

The SWF file includes a heap of tags. If the author wants his/her flash to have the advertising capability, the author can add some properties to the original SWF file. Such properties include the semantic topic of the whole flash video, what objects in the flash can be replaced, a short description of them, etc. Then we can get a .SWF ad file. Based on the labeling, one can modify the video by modifying a labeled object therein as or replacing it with an advertising object. Thus, when an end user watches the modified video, the ads will be perceived by the end user uninterrupted.

A SWF file includes many blocks.

FIG. 1 illustrates the structure. As shown in FIG. 1, a SWF file includes of a header, a series of tagged data blocks following the header and an end tag.

Following the header are a series of tagged data blocks. All tags share a common format. Data inside the block can point to other data within the block, but can never point to the data in another block. This means the blocks are independent from each other and enables tags to be removed, inserted, or modified.

There are two categories of tags in Macromedia Flash (SWF):

A definition tag is used to define the content of the Macromedia Flash (SWF) movie: the shapes, text, bitmaps and sounds that are used in the movie. In other words, a definition tag defines an object in a flash movie. Each definition tag assigns a unique ID to the content (object) it defines. The player then stores the IDs in a repository called the dictionary. In the following, both the content defined by a definition tag and the content plus the definition tag (that is, tagged data block) can be referred to as an object.

Control Tags are used to manipulate IDs in the dictionary, and control the flow of the movie. For example, control tags can be used to place objects represented by IDs on the screen, start sounds, and to tell the player to go to another frame in the movie, and etc.

Apparatus and Method for Labeling a Video and Video Searching Method

According to one aspect of the invention, it is proposed to label an object of interest or all the objects in a flash movie so as to facilitate searching, replacing and/or modifying an object of interest in the flash movie.

According to the aspect, marker tags are used to wrap an object of interest defined by SWF definition tags, indicating whether the object can be modified or replaced. As examples, modification of the object includes adding contents (such as logos of a business) into the object, replacing the contents in the object with new contents, and etc. The marker tags can also support some properties for facilitating said modification.

In a preferred embodiment, three types of marker tags can be defined, including topic tag, background tag and object tag. The explanation of these tags is shown in Table 1 below:

TABLE 1

| Type | Property | Usage |
| --- | --- | --- |
| Topic Tag | author, date (creating date, modifying date, etc.), type . . . | Keep the flash movie's information; and declare whether the video can be modified |
| Background Tag | name, color, width, height, content . . . | Declare whether the object can be modified |
| Object Tag | name, color, width, height, content . . . | Declare whether the object can be replaced with another object |

According to Table 1, a background tag can be used to label an object of interest to declare whether the object can be modified, and can contain information about the name, color, width, height, content, and etc. of the object as its properties.

An object tag can be used to label an object of interest to declare whether the object can be replaced with another object, and can contain information about the name, color, width, height, content, and etc. of the object as its properties.

The names of properties are self-explanatory, except content. The content property contains the original tag. When searching, modifying and/or replacing an object of interest, the information of the original tag can be used to do the work more accurately.

Based on background tags and/or object tags, objects in one video or a plurality of videos can be searched for at least one object of interest. The search is made based on the properties of the background tags and/or object tags. For example, a user can search for objects having a name of interest, or having a certain size (width and/or height), or having contents of interest. The objects searched out can be modified (such as added with other contents) or replaced depending on the type of the marker tag (background tag or object tag) and the needs of the user.

As a further more preferred embodiment, topic tags can be used to keep the video's information such as the author, the creating/modifying date and its type, etc, and can be also used to indicate whether the video can be modified. The topic tag can further facilitate the user's operations discussed above. For example, a user can be only interested in objects in videos of certain types, or of certain authors, of after a certain date. In such a condition, the topic tags can reduce the workload for searching. Apparently, using the properties contained in the topic tags, one can search a video of interest in a plurality of videos.

In the above method for labeling a video, the embodiment further provides an apparatus for labeling a video, to support the author to add properties to .SWF in an easy way. Its implementation can be based on the open format of SWG file. The input is the SWF file in binary. To ease your understanding, we use XML-like format for illustration. The output is the modified SWF ad file.

For purpose of illustration, we use a black-framed red square object having a width of 80 as an object to be labeled. Its normally defined shape tag is as follows:

```
<DefineShape id="1">
<FillStyleArray>
    <SolidFillStyle color="#FF0000"/>
</FillStyleArray>
<LineStyleArray>
    <LineStyle width="80" color="#000000"/>
</LineStyleArray>
<StyleChange lineStyle="1" fillStyle0="1">
    <MoveTo x="100" y="1100"/>
</StyleChange>
<StraightEdge dx=" 1000" dy="0"/>
<StraightEdge dx="0" dy="-1000"/>
<StraightEdge dx="-1000" dy=" 0"/>
<StraightEdge dx="0" dy=" 1000"/>
</DefineShape>
```

Here, the user wants to label the object as being capable of being modified. Then, the apparatus of the embodiment can enable the user to add properties to the object and get the output SWF ad file as below, letters in italic bold face are the new properties added by the apparatus.

```
<obj_ads id="1" name="square", color="blue", width="20",
height="50">
<content>
    <DefineShape id="1">
    <FillStyleArray>
        <SolidFillStyle color="#FF0000"/>
    </FillStyleArray>
    <LineStyleArray>
        <LineStyle width="80" color="#000000"/>
    </LineStyleArray>
    <StyleChange lineStyle="1" fillStyle0="1">
        <MoveTo x="100" y="1100"/>
    </StyleChange>
    <StraightEdge dx=" 1000" dy="0"/>
    <StraightEdge dx=" 0" dy="-1000"/>
    <StraightEdge dx="-1000" dy="0"/>
    <StraightEdge dx=" 0" dy=" 1000"/>
    </DefineShape>
</content>
<obj_ads>
```

From above, it can be seen that the apparatus 200 (FIG. 2) for labeling a video can be any editor capable of editing the flash file. Specifically, the labeling operation can be implemented by first labeling means 204 composing labeling sentences in the flash file to label an object of interest with its properties. As further examples, such labeling means can include tool buttons on the graphic user interface (GUI) and inputting means such as a keyboard, a mouse, or the like.

Specifically, the first labeling means 204 can be configured to label an object as being replaceable or modifiable. As mentioned above, the properties that can be labeled on an object can also include name, color, size, content, etc., of the object.

Also, a second labeling means 206 can be provided for labeling the entire flash file with its properties, which can include the author, type, creating date, modifying date and information about whether the video can be modified. These properties of the video can reflect the subjects such as sport, health exercise, leisure or entertainment, food and drink, in particular such as basketball, football etc.

Apparatus and Method for Modifying a Video

According to another aspect of the invention, an apparatus and a method are provided for modifying a video subjecting labeling with the apparatus and method for labeling a video.

According to the method, a labeled object in a labeled video can be replaced by another object, or can be modified, such as being provided with new contents.

Still taking the above mentioned red square as an example, if it is labeled as mentioned above, then judge whether the size and color of the new replacement object (e.g. new blue square object) match those of the replaceable red square object in the video: if the size and/or color of the new replacement object do not match those of the replaceable red square object in the video, then modify the size and/or color of the new replacement object using an existing technology, so as to have them to match those of the replaceable object in the video; if the size and color of the new replacement object match those of the replaceable red square object in the video, then replace the red square object with e.g. the new blue square object. It can be noticed that the codes <SolidFillStyle color="#FF0000"/> in the original file are replaced by <SolidFillStyle color="#0000FF"/> in the output file.

```
<DefineShape id="1">
<FillStyleArray>
    <SolidFillStyle color="#0000FF"/>
</FillStyleArray>
<LineStyleArray>
    <LineStyle width="80" color="#000000"/>
</LineStyleArray>
<StyleChange lineStyle="1" fillStyle0="1" fillStyle1="2">
    <MoveTo x="100" y="1100"/>
</StyleChange>
<StraightEdge dx=" 1000" dy="     0"/>
<StraightEdge dx="    0" dy="-1000"/>
<StraightEdge dx="-1000" dy="     0"/>
<StraightEdge dx="    0" dy=" 1000"/>
</DefineShape>
```

As an alternative, words such as a logo of a business can be written in the original red square as a modification to the original object.

The replacement and/or modification can be implemented manually by browsing the labeled video file and replacing an object when the user finds that the object has been labeled as replaceable or modifying the object when the user finds that the object has been labeled as modifiable. Alternatively, the user can, using the properties labeled on the objects, search the labeled video file for an object of interest, for example, an object of predetermined color, size and/or shape, and etc., and replace the hit object(s) with desired new object(s) or modify them appropriately. In a case where one or more video files themselves are labeled, as mentioned above, the user can search more than one video file for desired labeled object(s), taking the information in the topic tag for labeling the video into account.

In the above method for modifying a video, the present embodiment further provides an apparatus for modifying a video as shown in FIG. 3, to support the author to replace and/or modify an object in a .SWF file in an easy way. Its implementation can be based on the open format of a SWF file. The input is labeled a SWF file with the properties listed in italic bold face as discussed above, and the output is modified normal flash file with an object therein modified and/or replaced.

Similarly, from above, it could be seen that the apparatus 300 for modifying a video can be any editor capable of editing the flash file. Specifically, the modifying operation can be implemented by composing the labeled codes in the flash file to replace and/or modify a labeled object of interest. As further examples, such composing means can include tool buttons on the graphic user interface (GUI) and inputting means such as a keyboard, a mouse, or the like.

Specifically, the modifying apparatus 300 can include replacing means 304 for replacing codes representing the labeled object with codes representing a new object, and modifying means 306 for modifying the codes representing the labeled object to change the contents of or add new contents to the object. Also, it can be imagined that the replacing means 304 and the modifying means 306 can be embodied as corresponding buttons on the GUI.

If, as discussed above, the replacement and/or modification is implemented manually, then it suffices that the apparatus 300 includes replacing means 304 and/or modifying means 306. In a case where more than one object is labeled in a video, and/or in a case where more than one video is labeled, the apparatus 300 can further includes searching means 302 for searching the labeled video file(s) for labeled object(s) of interest and replace the hit object(s) with desired new object (s) or modify them appropriately.

It can be seen that to modify a video with the present apparatus or method, the video to be modified should be a video labeled with the above-mentioned apparatus or method for labeling a video. Nevertheless, the apparatus or method for modifying a video and the apparatus or method for labeling a video can be implemented either separately or in combination. It is possible that some users, such as an author of a video, can label the video with the apparatus or method for labeling a video, but they need not to modify the video. For instance, they may sell the labeled videos to an advertiser or platform provider, and it is the advertiser or platform provider who modifies the labeled video by replacing the labeled object with new one or modifying the object by adding new contents there into.

Furthermore, as will be discussed below, the new object or the modified object can be an interactive object or an object with interactive content.

Advertising Method

Based on above discussed apparatus or method for labeling a video and apparatus or method for modifying a video, the present application also proposes a brand new model for video ads, that is the video processing method, by which the users watching the content video will watch the ads uninterrupted at the same time.

According to one preferred embodiment of the method, as shown in FIG. 4, an author 401 can edit a flash video with an object therein labeled. Imaginably, there can be such a case where one author edits a flash video (Step 410), while another author labels the video with the above-discussed apparatus or method for labeling a video (Step 412). The labeled video 414 can be then provided to a platform provider 402 (Step 416), where more than one video of more than one author can be collected (Step 418), thereby creating a video database, in which each video can be classified according to the video subject or each video can be labeled with its property in advance, the properties including its author, type, creating date, modifying date and information about whether the video can be modified and these properties of the video can reflect the subjects such as sport, health exercise, leisure or entertainment, food and drink, in particular such as basketball, football etc. Then, the labeled videos 420 can be searched based on the subject of interest of the advertiser in the video database (if there are more than one video and/or the video contains more than one labeled object); and after determining the video having a marching subject, said video can be modified with advertising objects according to the advertiser's requirements 428 (Step 422) or by the advertiser 403 itself (not shown). Finally, any end user 404 watching the modified videos 424 on the platform will watch the embedded ads uninterrupted (Step 426).

In the technical solution for replacing a replaceable object in the video of interest with an advertising object (i.e. a new replacement object) provided by an advertiser, after an advertiser provides an advertising object, searching the database for a video having the subject marching the subject related to the advertising object, and then determining, in the video as searched out and having the matching subject, a replaceable object having its property matching the property of the advertising object. In particular, the way for determining as above includes: judging whether the size and color of the advertising object match those of the replaceable object in the video; if the size and color of the new replacement object do not match those of the replaceable object in the video, then modify the size and/or color of the advertising object using an existing technology so as to match those of the replaceable object in the video.

A corresponding video processing apparatus is provided for replacing a replaceable object in a video with a new replacement object, including: video providing means for providing a video including a plurality of objects, wherein at least one object is labeled with at least one of the following properties: whether the object is replaceable; and at least one of the name, color, size and content of the object; object providing means for providing a new replacement object; searching means for searching the objects of the video for object of interest based on property of the new replacement object, the property of the new replacement object including at least one of the name, color, size and content of the new replacement object; determining means for determining a replaceable object in the video having a property matching that of the new replacement object; and replacing means for replacing the replaceable object as determined with the new replacement object.

According to the method, a lot of user generated .SWF ad files can be uploaded to the SWF ad repository of the platform provider 402. Then the platform provider 402 can negotiate with advertiser 403 on which types of flash the advertiser want to do ads, and design a charge policy together. Next, by using the advertising objects provided by the advertiser, the platform provider can inject the ads into the video by the help of above discussed apparatus and method for modifying a video. At this time, the advertisements on the flash have been completed. Preferably, the modified video can be provided to the author for review and gain some feedback and/or get the rights to use them (as shown with dashed arrows in FIG. 4).

According to the method, three parties including the authors, the platform provider and the advertiser can cooperate effectively and all sides get the benefit. By embedding the relevant ads inside the videos, the ads are watched by the end-user uninterrupted because the ads are absorbed in the content of the video. This has multiple benefits: the end users can NOT bypass the ads when watching video; the ads are lively in the video contents which will get more focus and impression from the end users; and at the same time, it is more comfortable to the end user, who does not need to spend extra time for ads while watching wanted video. Last but not least, it utilize the power of user to generate contents and the advertiser can use the existed user generated videos, greatly releasing the advertiser from putting money on making impressing ads video.

Figure 5:
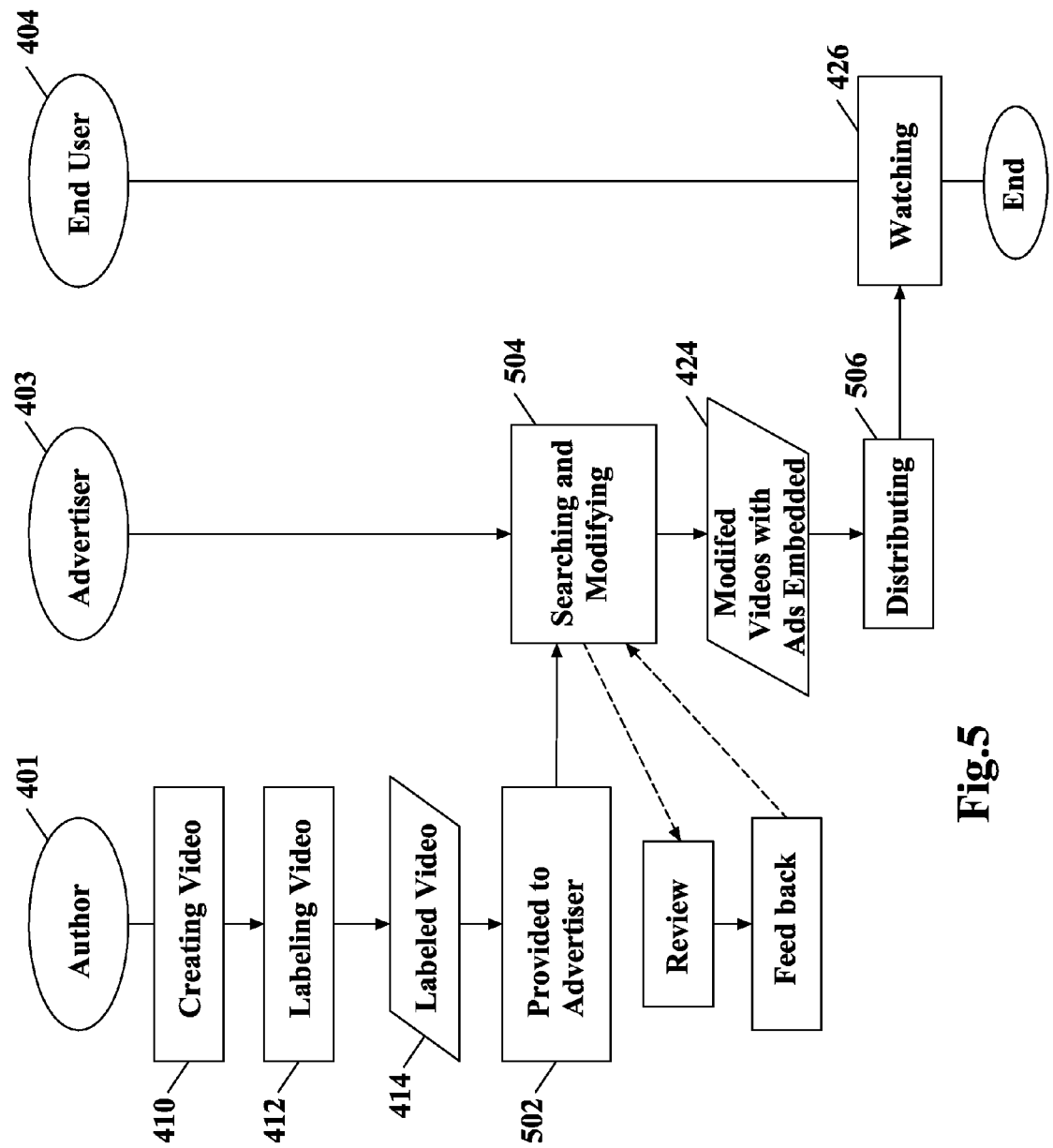
FIG. 5 is a schematic view of an advertising method according to another embodiment of the invention.

As shown in FIG. 5, the author can provide the labeled video directly to the advertiser (Step 502), who can modify the video with ads object (Step 504) and distributes the modified videos 424 with adds embedded (including but not limited to putting modified videos on a platform owned by a platform provider) (Step 506). In such a case, the author and the advertiser can interact with each other through any platform or intermediate, and the modified videos can be distributed through any means as long as the end users can watch the videos.

As to the profit model, advertisers pay the money to platform provider and author based on the factors below:

how many and how important the tags the advertiser has chosen to do ads on the videos are;

which ads are visited how many times by end users;

the effect of an ads in an video, such as how many seconds the ads play in the video, its size, and etc. platform provider can support a tool to estimate this effect in an quantitative way;

if the user click a clickable object in the flash and then link to the advertiser's website, the click amount will be charge in a higher way. Correspondingly, the ads object can be designed as an interactive object, and when user wanted, he can click on the ads object appearing in the video to link to relevant website.

Other Embodiments

The invention also can be applied to MPEG-4 videos. Because media object is the core concept of MPEG-4 specification and MPEG-4 video supports the object orientation, the objects of MPEG-4 video are classified into 3 kinds: a. Still images (e.g. static background) b. Video objects (e.g. a talking person, a moving cell phone) c. Audio objects (e.g. the voice associated with a person, background music), all of which are recognizable. Thus if the MPEG-4 be realized perfectly, the invention can also be used by labeling, modifying and/or searching the objects in a MPEG-4 video, so as to employ the present invention in MPEG-4 stream. Because the MPEG-4's market size should be much larger than the flash video, the invention can work more effectively.

A person skilled in the art can understand that any or all of the steps/components of the method and apparatus according to the invention can be implemented in form of hardware, firmware, software of any combination thereof in any computing equipment (including a processor and storing media and etc.) or any network of computing equipments, and could be realized by the basic programming skills of any person skilled in the art having read the description of the invention, and more detailed description is omitted here.

Furthermore, in the above description, when concerning operations such as labeling, replacing and so on, it is obviously necessary to use a display device and an input device connected to a computing equipment, corresponding interfaces and controller software. In a word, relevant hardware and software in a computer, a computer system or a computer network, along with hardware, firmware or software implementing the operations in the method of the invention described above, or any combination thereof, constitute the apparatus of the invention and components thereof.

Therefore, based on above understanding, the object of the invention can also be achieved by one application or one group of applications running on any information processing equipment, which can be a well-known existing technology.

Therefore, the object of the invention can also be achieved by simply providing a program product including program codes capable of realizing the method or apparatus as described above. That is to say, such a program product constitutes the invention, and any storing media with such a program product stored therein also constitutes the invention. Obviously, said storing medium can be any well-known storing medium or any storing medium developed in the future, therefore it is unnecessary to list all the storing media here.

In the method and apparatus according to the invention, the component or steps can be decomposed and/or re-combined. The decomposition and/or recombination shall be regarded as equivalents of the invention.

Preferred embodiments according to the invention have been described above. A person skilled in the art will understand that the protection scope of the invention is not limited to the specific details disclosed herein, which can have various variations and equivalents within the spirit of the invention.

We claim:

1. A method of processing a video having a plurality of objects, the method comprising the steps of:
   labeling at least one object among said plurality of objects with a property selected from the group consisting of: whether said object can be modified; whether said object can be replaced; and at least one of: name, color, size, and content;
   replacing said at least one object with another object having a property matching therewith if said object has been labeled as one that can be replaced; and
   modifying said at least one object to obtain a new object if said object has been labeled as one that can be modified.

2. The method according to claim 1, wherein said another object or said new object is selected from the group consisting of an advertisement object and an interactive object.

3. The method according to claim 1, further comprising:
   after said labeling step, the step of searching said video for an object of interest having said properties labeled on said at least one of said objects.

4. The method according to claim 1, further comprising:
   labeling said video itself with said properties, so as to be able to search said video using said properties labeled on said video after said labeling step.

5. The method according to claim 4, wherein the step of labeling said video itself with said properties comprises:
   labeling said video with at least one of: an author, type, creating date, modifying date, and information about whether said video can be modified.

6. A method for modifying a video, wherein at least one object in the video has been labeled with properties of the object, the method comprising:
   replacing said at least one object with a replacement object having a property matching therewith if said object has been labeled as one that can be replaced;
   modifying said at least one object if said object has been labeled as one that can be modified;
   searching said video for object labeled with at least one of: can be replaced and/or can be modified; and
   optionally, before the step of replacing said at least one object, judging whether the size and/or color of said new replacement object match those of said object labeled as can be replaced in said video;
   if the size and/or the color of said new replacement object do not match those of said object labeled as one that can be replaced in said video, modifying the size or color of said new replacement object so as to match said object labeled as one that can be replaced in said video.

7. The method according to claim 6, wherein said video has been labeled with said properties, and wherein the searching step further comprises:
   searching for said video among at least two videos using said properties labeled on said at least two videos.

8. The method according to claim 6, wherein said replacement object is an interactive object or said at least one object is modified to become an interactive object or become an object with interactive content.

9. An apparatus for labeling a video comprising:
   a plurality of objects;
   a first labeling means for labeling at least one object among said plurality of objects with a property selected from the group consisting of: whether said object can be modified; whether said object can be replaced; and at least one of: name, color, size and content of said object; and
   optionally, a second labeling means for labeling said video with said property, wherein said second labeling means is configured to label said video with at least one of: author, type, creating date, modifying date, and whether said video can be modified.

10. An apparatus for modifying a video having a plurality of objects wherein at least one object in said video has been labeled with a property, the apparatus comprising:
   a replacing means for replacing said at least one object with a new object if said object has been labeled as one that can be replaced;
   a modifying means for modifying said at least one object if said object has been labeled as one that can be modified; and
   optionally, a searching means for searching said object to be replaced or modified using said property labeled on said at least one object.

11. The apparatus for modifying a video according to claim 10, wherein said video has been labeled with its property and the searching means is further configured to search for the video among at least two videos using the properties labeled on said at least two videos.

12. The apparatus according to claim 10, wherein said new object is an interactive object or said at least one object is modified to become an interactive object or become an object with interactive content.

13. A method of processing a video, comprising the steps of:
   providing a video having a plurality of objects, wherein at least one object is labeled with a property selected from the group consisting of: whether said object is replaceable and at least one of: name, color, size and content of said object;
   providing a new replacement object;
   searching said objects of said video for an object of interest based on a plurality of properties of said new replacement object, wherein said properties of said new replacement object includes at least one of: name, color, size and content of said new replacement object;
   determining said replaceable object in said video having at least one of said properties matching that of said new replacement object; and
   replacing said replaceable object as determined with said new replacement object.

14. The method of processing a video according to claim 13, wherein said step of providing a video having a plurality of objects comprises the steps of:
   providing a database of a plurality of videos, each video being labeled as or classified as some certain subjects;
   after said step of providing a new replacement object, searching said database for a video having a subject matching that of said new replacement object, based on the subject related to said new replacement object; and
   thereafter searching said video as searched for an object having a matching property based on property of the new replacement object.

15. The method of processing a video according to claim 13, wherein said step of determining a replaceable object having a property matching that of said new replacement object, wherein the method comprises:
   judging whether the size and/or color of said new replacement object match those of said replaceable object in said video, wherein if the size and/or color of said new replacement object does not match those of said replaceable object in said video, then modifying the size and/or color of said new replacement object so as to match those of said replaceable object.

16. An apparatus for processing a video, comprising:
   a video providing means for providing a video having a plurality of objects, wherein said at least one object is labeled with a property selected from the group consisting of: whether said object is replaceable and at least one of: name, color, size and content of said object;
   an object providing means for providing a new replacement object;
   a searching means for searching objects of the video for an object of interest based on said properties of said new replacement object having said property of at least one of: name, color, size and content;
   a determining means for determining a replaceable object in the video having at least one of said properties matching that of said new replacement object; and
   a replacing means for replacing said replaceable object with said new replacement object.

* * * * *